United States Patent
Wakata (10) Patent No.: US 12,546,089 B2
(45) Date of Patent: Feb. 10, 2026

(54) CONSTRUCTION MACHINE

(71) Applicant: YANMAR HOLDINGS CO., LTD., Osaka (JP)

(72) Inventor: Tatsumasa Wakata, Fukuoka (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 407 days.

(21) Appl. No.: 18/177,259

(22) Filed: Mar. 2, 2023

(65) Prior Publication Data

US 2023/0304259 A1 Sep. 28, 2023

(30) Foreign Application Priority Data

Mar. 25, 2022 (JP) .................... 2022-050946

(51) Int. Cl.
| | |
|---|---|
| *B60K 11/08* | (2006.01) |
| *B60K 13/02* | (2006.01) |
| *E02F 9/08* | (2006.01) |
| *F02M 35/08* | (2006.01) |
| *F02M 35/16* | (2006.01) |

(52) U.S. Cl.
CPC ............ *E02F 9/0866* (2013.01); *B60K 11/08* (2013.01); *B60K 13/02* (2013.01); *F02M 35/08* (2013.01); *F02M 35/164* (2013.01)

(58) Field of Classification Search
CPC ....... E02F 9/0866; B60K 11/08; B60K 13/02; F02M 35/08; F02M 35/164
See application file for complete search history.

(56) References Cited

U.S. PATENT DOCUMENTS 10,287,962 B2 * 5/2019 Kurokawa ............ B62D 49/06
2017/0218832 A1 8/2017 Kurokawa et al.

FOREIGN PATENT DOCUMENTS

| CN | 106168042 A | 11/2016 |
|---|---|---|
| EP | 3208125 A1 | 8/2017 |
| JP | 2004-352089 A | 12/2004 |
| JP | 2013087542 A * | 5/2013 |
| JP | 2013104167 A * | 5/2013 |
| JP | 2013-177748 A | 9/2013 |

(Continued)

OTHER PUBLICATIONS

Japanese Notice of Reasons for Refusal for Japanese Patent Application No. 2022-050946 (dated Nov. 26, 2024).

(Continued)

*Primary Examiner* — Bryan A Evans
(74) *Attorney, Agent, or Firm* — Future IP LLC; Tomoko Nakajima (57) ABSTRACT

To provide a construction machine capable of improving cooling efficiency of a heat exchanger and reducing noise in a configuration in which a prime mover, a heat exchanger, and an air cleaner for supplying clean air to the prime mover are arranged in an engine room. The excavation work machine comprises an engine room provided on a swivel frame and housing equipment including an engine and a heat exchange unit, a ventilation part provided on a right exterior cover forming a side wall of the engine room and having a plurality of ventilation holes for communicating inside and outside of the engine room, and an air cleaner arranged between the heat exchange unit and the ventilation part in the engine room, and supplying cleaned air to the engine.

8 Claims, 7 Drawing Sheets

(56) References Cited

FOREIGN PATENT DOCUMENTS

| JP | 2016-078827 A | 8/2017 |
|---|---|---|
| JP | 6546056 B2 | 7/2019 |
| WO | WO2014073342 A1 | 5/2014 |
| WO | WO2014088033 A1 | 6/2014 |

OTHER PUBLICATIONS

Extended European Search Report for Patent Application No. 23160492.7 (Dated Aug. 3, 2023).

* cited by examiner

RIGHT ←----→ LEFT

CONSTRUCTION MACHINE

TECHNICAL FIELD

The present invention relates to a construction machine provided with an engine room in which a prime mover is arranged.

BACKGROUND ART

Conventionally, a heat exchanger for cooling fluids such as engine cooling water and an air cleaner for purifying air supplied to an engine are arranged in an engine room of a construction machine. An exterior cover, which constitutes a side wall of the engine room, has ventilation holes for taking outside air into the engine room.

In Patent Document 1, a construction machine is proposed in which an air cleaner is arranged on a side of an exterior cover close to ventilation holes, and intake air cleaned by the air cleaner is supplied to an engine via an intake piping disposed in a space above a radiator and an oil cooler (heat exchanger) installed adjacent to the engine.

PRIOR ART DOCUMENT

Patent Document

Patent Document 1: Japanese Patent No. 6546056

SUMMARY OF INVENTION

Technical Problem

In the construction machine disclosed in Patent Document 1, the air cleaner is arranged facing the ventilation holes of the exterior cover. This causes air taken in from the ventilation holes to hit the air cleaner, which disturbs the air flow and reduces cooling efficiency of the radiator and the oil cooler. In addition, a sound (intake noise) when air is sucked into the engine via the air cleaner and intake piping leaks out through the ventilation holes, causing a noise problem during operation of the construction machine.

The present invention is made in view of the above problem, and an object of the present invention is to provide a construction machine capable of improving cooling efficiency of a heat exchanger and reducing noise in a configuration in which a prime mover, a heat exchanger, and an air cleaner for supplying clean air to the prime mover are arranged in an engine room.

Solution To Problem

The construction machine according to the present invention is a construction machine comprising an engine room provided on a vehicle body frame, and housing equipment including a prime mover and a heat exchanger, a ventilation part provided on an exterior cover forming a side wall of the engine room, and having a plurality of ventilation holes for communicating inside and outside of the engine room, and an air cleaner arranged between the heat exchanger and the ventilation part in the engine room, and supplying cleaned air to the prime mover.

The construction machine according to another aspect of the present invention is a construction machine in which the ventilation part has a shielding plate part for separating the inside of the engine room from the outside, the plurality of ventilation holes is provided so as to surround the shielding plate part, and the air cleaner is arranged adjacent to the shielding plate part.

The construction machine according to another aspect of the present invention is a construction machine in which the air cleaner has a cleaner body part for removing dust contained in outside air and an outside air introduction part for introducing outside air into the cleaner body part, the cleaner body part being arranged adjacent to the shielding plate part.

The construction machine according to another aspect of the present invention is a construction machine in which the air cleaner is arranged so that a suction port for air, which is provided at the outside air introduction part, is adjacent to the shielding plate part.

The construction machine according to another aspect of the present invention is a construction machine in which the outside air introduction part of the air cleaner is disposed in the cleaner body part with the suction port facing a direction of a floor surface of the engine room.

The construction machine according to another aspect of the present invention is a construction machine in which the outside air introduction part of the air cleaner is extended downward from a side surface of the cylindrical cleaner body part.

The construction machine according to another aspect of the present invention is a construction machine in which the air cleaner is arranged vertically with end parts of the cylindrical cleaner body part as an upper end and a lower end, and is arranged with the lower end part of the cleaner body part inclined downward toward the ventilation part.

The construction machine according to another aspect of the present invention is a construction machine in which the air cleaner has a dust discharge part protruding downward from a side surface of the cleaner body part.

Advantageous Effects of Invention

According to the present invention, the cooling efficiency of the heat exchanger can be improved and the noise can be reduced in a configuration in which the prime mover, the heat exchanger, and the air cleaner for supplying clean air to the prime mover are arranged in the engine room.

DESCRIPTION OF EMBODIMENTS

The present invention is designed to improve cooling efficiency of a heat exchanger arranged in an engine room and sound insulation in a configuration in which a prime mover, a heat exchanger, and an air cleaner for supplying clean air to the prime mover are arranged in the engine room. A description will hereinafter be made on an embodiment of the present invention with reference to the drawings.

In the embodiment of the present invention, a description will be made on an excavation work machine (shovel), which is a swiveling work vehicle, as an example of a construction machine according to the present invention. However, the construction machine according to the present invention is not limited to the excavation work machine, and can widely be applied to other types of the construction machines such as a bulldozer, a crane work machine, a compact track loader, a skid-steer loader, and a wheel loader.

Figure 1:
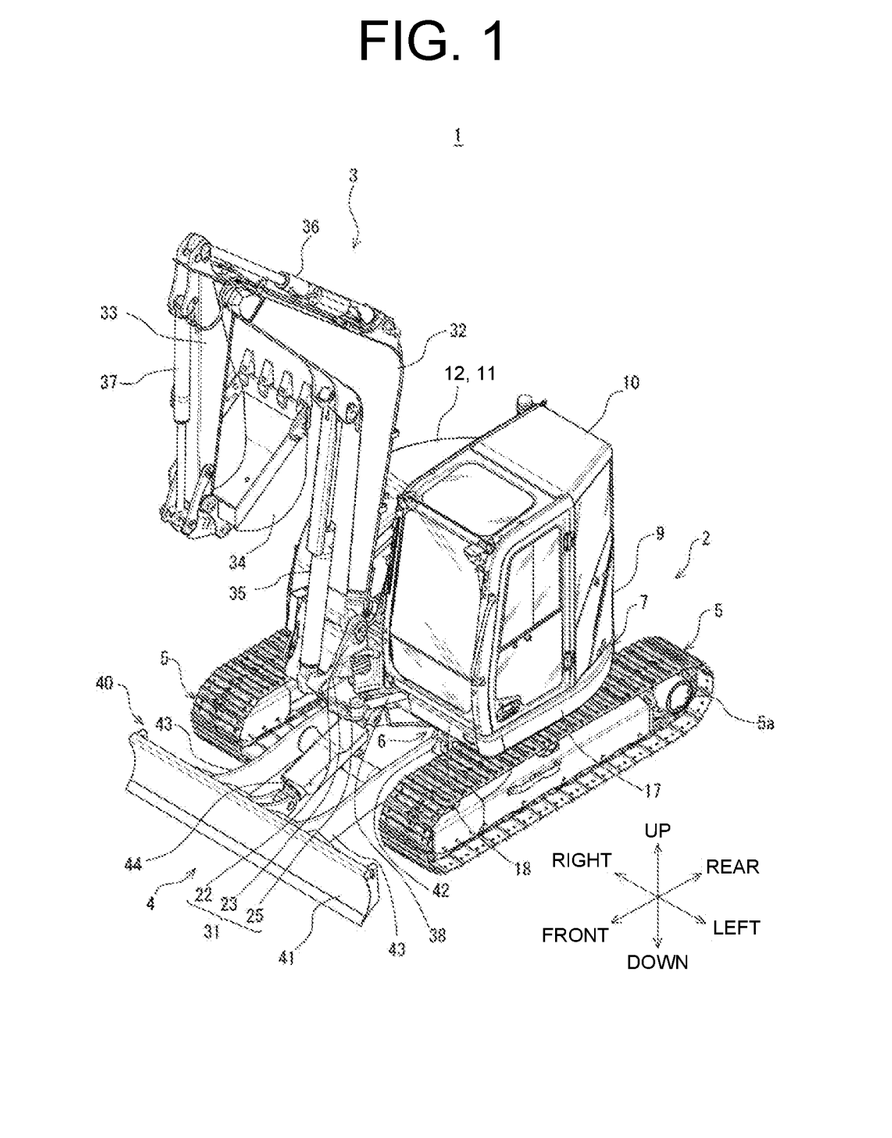
FIG. 1 is a perspective view of an excavation work machine according to an embodiment of the present invention.
Figure 2:
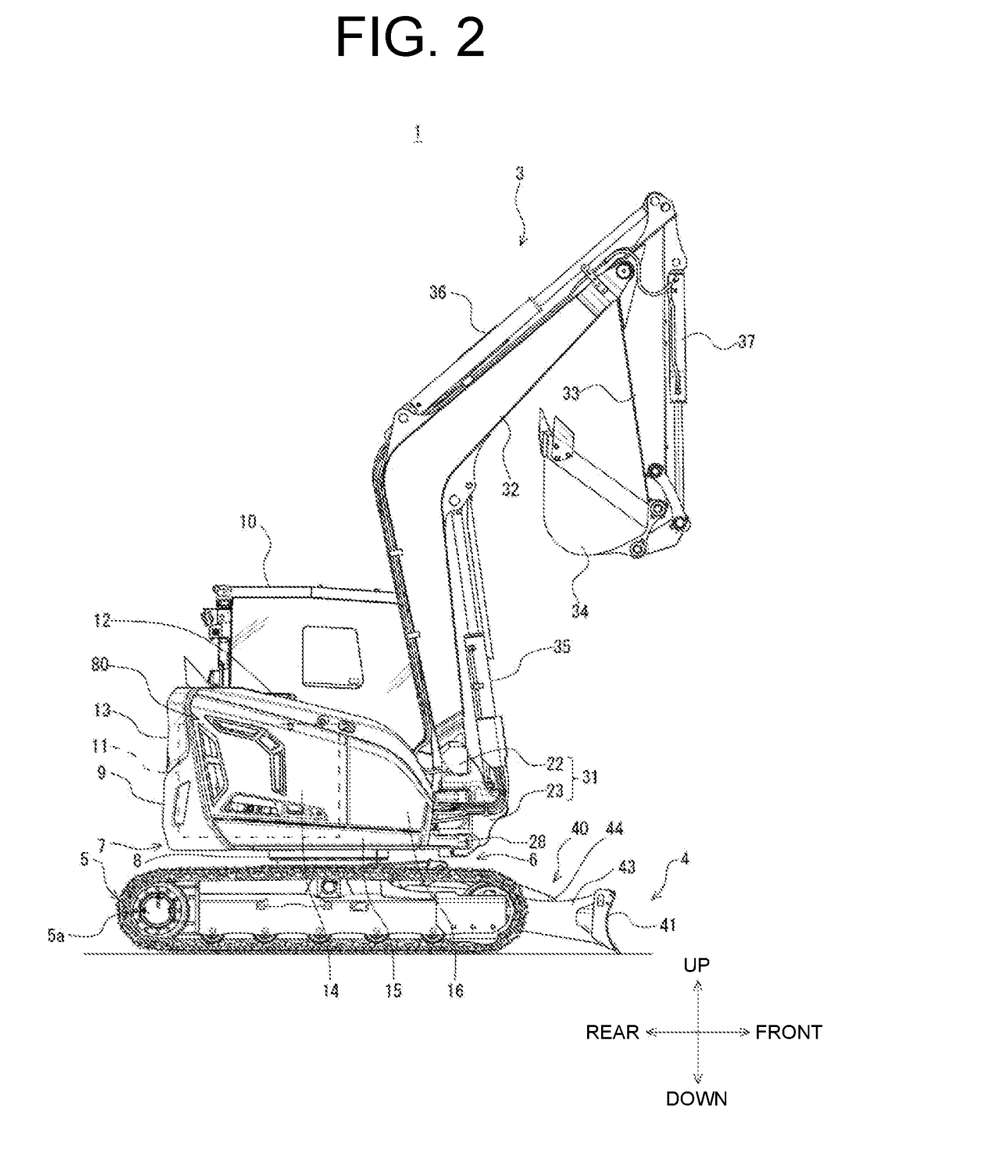
FIG. 2 is a right side view of the excavation work machine according to the embodiment of the present invention.

A description will be made on an overall configuration of the excavation work machine 1 according to the present embodiment with reference to FIGS. 1 and 2. As shown in FIGS. 1 and 2, the excavation work machine 1 comprises a traveling vehicle body (machine body) 2 that can be self-propelled, and an excavating device 3 and a soil removal device 4, each of which is a work equipment attached to the traveling vehicle body 2.

The traveling vehicle body 2 has a right and left pair of crawler-type traveling parts 5, 5 and a machine body frame 6 as a base interposed between the left and right traveling parts 5, 5.

The traveling part 5 has a configuration in which a crawler is wound around a sprocket, an idler, and a plurality of rollers that are supported by the machine body frame 6. The traveling part 5 has a drive sprocket 5a, which is a drive wheel, at a rear end thereof.

The soil removal device 4 is attached to a front side of the machine body frame 6. The soil removal device 4 comprises a support frame 40 and a blade 41, which is a soil removal plate supported by the support frame 40. The soil removal device 4, including these configurations, is approximately configured to be bilaterally symmetrical as a whole.

The support frame 40 is supported in a rotatable up and down manner with respect to the traveling vehicle body 2 and includes left and right arms 43 extending in a front-rear direction between the left and right traveling parts 5, 5. The left and right arms 43 are supported at base end parts thereof by a support bracket 42 provided at a front part of the machine body frame 6 with a right-left direction as a rotation axis direction. The support frame 40 is rotated up and down by extension and contraction of a blade cylinder 44. In other words, the blade 41 rotates up and down via the support frame 40 as the blade cylinder 44 extends and retracts.

The traveling vehicle body 2 has a swivel frame 7, which is mounted on the traveling part 5 and can be swiveled with respect to the traveling part 5. The swivel frame 7 is connected to the machine body frame 6 via a swivel bearing 8 and can swivel in either the left or right direction around an axis in an up-down direction with respect to the machine body frame 6 by drive of a swivel motor (not shown).

The excavating device 3 is attached to a front side of the swivel frame 7. The excavating device 3 has a boom 32 that constitutes a base side part thereof, an arm 33 that is coupled to a tip end side of the boom 32, and a bucket 34 that is attached to a tip end part of the arm 33. The excavating device 3 also has a boom cylinder 35 that causes the boom 32 to be rotationally operated, an arm cylinder 36 that causes the arm 33 to be rotationally operated, and a bucket cylinder 37 that causes the bucket 34 to be rotationally operated.

A base end part of the boom 32 is supported by a boom support bracket 31. The boom support bracket 31 is supported by a bracket attaching part 28 protrusively provided at the swivel frame 7 via a swing axis with the up-down direction as a rotation axis direction.

The boom support bracket 31 has a boom support part 22 that rotatably supports the base end of the boom 32 with the right-left direction as a rotation axis direction, a boom cylinder support part 23 that supports a lower end of the boom cylinder 35, and a swing cylinder coupling part 25 that is coupled to a tip end of a rod of a swing cylinder 38. The boom support bracket 31 rotates around the swing axis by operation of the swing cylinder 38, thereby causing the excavating device 3 to rotate to the left or right.

The boom cylinder 35, the arm cylinder 36, the bucket cylinder 37, and the swing cylinder 38 are all hydraulic cylinders operated by pressure oil discharged by a hydraulic pump (not shown). In the excavating device 3, the bucket 34 is detachably attached as a work attachment, and other attachments such as a gripper (fork) or a crusher (breaker) are attached instead of the bucket 34 according to contents of work.

On the swivel frame 7, there are provided a cabin 10 that houses a driving part where an operator drives and operates the traveling part 5 and the work equipment, and an engine room 11 that houses an engine 53, a battery 54, a fuel tank for the engine and a hydraulic oil tank for the hydraulic cylinders.

The engine room 11 is provided on the swivel frame 7 from a right side of the cabin 10 to rear. The cabin 10, which is arranged on a left side front of the swivel frame 7, and the engine room 11 are partitioned, in the rear of the swivel frame 7, by a rear part wall 19 (see FIGS. 3 and 4) of the cabin 10, and the rear part wall 19 is inclined in a front-low rear-high shape. The engine room 11 is covered by an exterior cover.

The exterior cover is composed of several members of different shapes and sizes, depending on a shape of the swivel frame 7 and an arrangement of the configuration on the swivel frame 7. An upper of the engine room 11, which is a right side of the swivel frame 7, is covered by a right upper cover 12, which is configured so as to be openable and closable. A rear of the engine room 11 is covered by a rear cover 13 and a counterweight 9 that is used to balance the weight with the excavating device 3. A right side surface of the engine room 11 on the swivel frame 7 is covered by a right exterior cover 14. A right side lower part of the engine room 11 is covered by a right lower cover 15. A right side front of the engine room 11 is covered by a right front exterior cover 16. A left side lower part of the cabin 10 is covered by a left lower exterior cover 17. A front side lower part of the cabin 10 is covered by a front cover 18.

A driver's seat is provided in the cabin 10. There are provided a traveling lever for making the traveling part 5 travel, several operation pedals, work operation levers, and an operation panel part, etc. for swiveling the swivel frame 7 and operating the work equipment, around the driver's seat.

In the excavation work machine 1 that has the configuration as described above, a desired operation or work is performed when an operator who is getting on the cabin 10 appropriately operates the traveling lever and/or the work operation lever, etc. For example, by operating the traveling lever, the traveling part 5 performs either straight forward and backward traveling or right and left turning traveling, and by operating the work operation lever, the excavating device 3 performs excavation work, or the soil removal device 4 performs soil removal work and/or leveling work.

Figure 7:
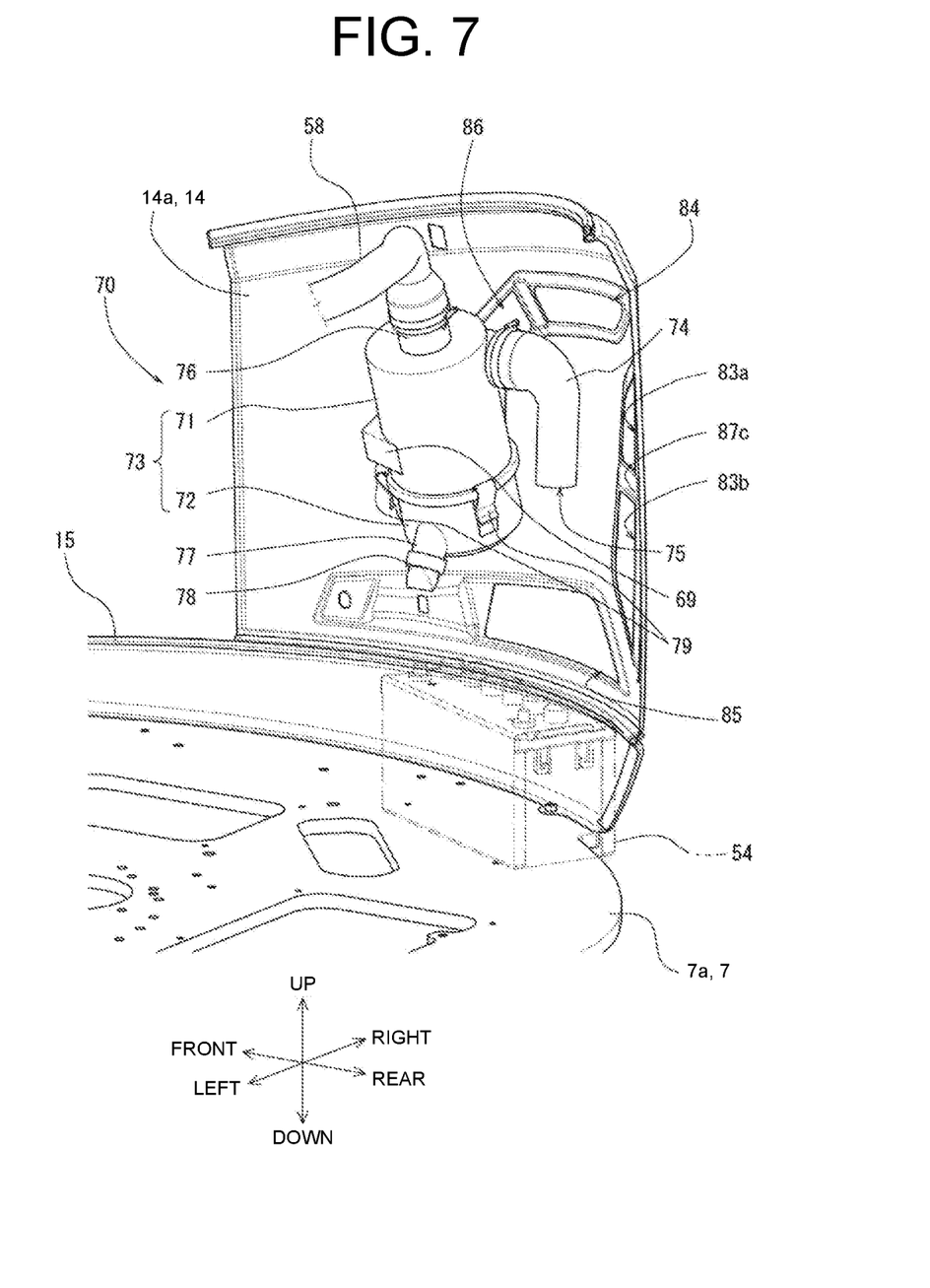
FIG. 7 is an enlarged perspective view illustrating an arrangement of an air cleaner.

In the excavation work machine 1 according to the present embodiment, the arrangement of the configuration, especially an air cleaner 70 and the surroundings thereof, in the engine room 11 on the swivel frame 7 is described with reference to FIGS. 3 to 7. In FIGS. 3 to 6, the cabin 10, the excavating device 3, the attachment structure of the excavating device 3 onto the swivel frame 7, the fuel tank, the hydraulic oil tank, hydraulic hoses and wiring, etc. are omitted. In a right side view (IV arrow view) shown in FIG. 5, a state in which the right exterior cover 14 is removed is further shown. In addition, FIG. 7 shows an enlarged view of the configuration surrounding the air cleaner 70 as seen from inside the engine room 11. In FIG. 7, an adjustment plate described below on the right exterior cover 14 is omitted.

Figure 3:
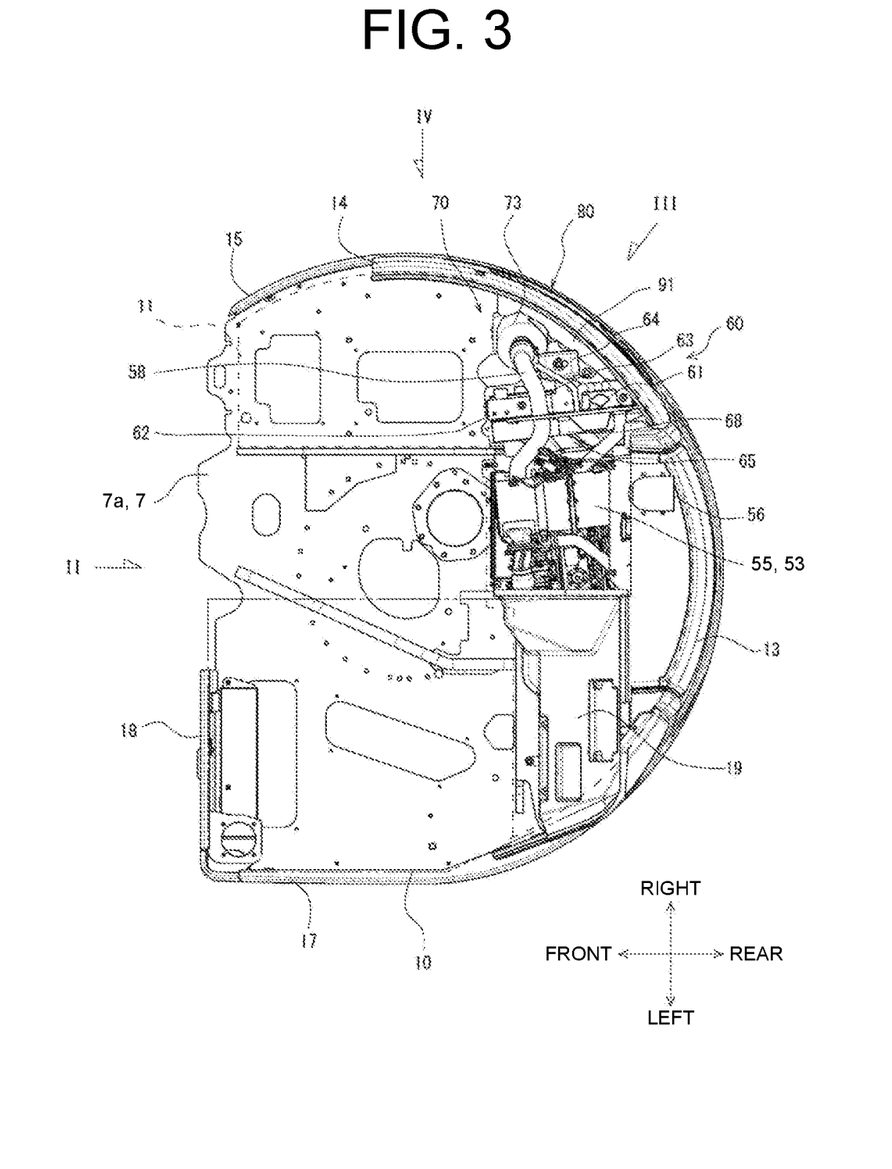
FIG. 3 is a plan overview of a swivel frame illustrating an arrangement of an engine room configuration of the excavation work machine according to the embodiment of the present invention.

The engine room 11 is formed, as shown in FIG. 3 in broken lines, as a space in which a bottom plate 7a of the swivel frame 7 is used as a floor, a right side surface is covered by the right exterior cover 14, which is the side surface cover of the swivel frame 7, an upper part is covered by the right upper cover 12, and a rear part covered by the rear cover 13 and the counterweight 9. The fuel tank, the hydraulic oil tank, the engine 53, the battery 54, a heat exchange unit 60, a cooling fan 65, and the air cleaner 70 are arranged in the engine room 11. The fuel tank and the hydraulic oil tank, which are not shown, are arranged at a right side front of the swivel frame 7.

The engine 53 is a diesel engine that receives fuel supplied from the fuel tank and is transversely arranged at a rear side of the swivel frame 7. Outside air, which is removed and purified by the air cleaner 70 described below, is sent to a supercharger 57 through an intake piping 58 and supplied to each cylinder of the engine 53. Combustion gases generated in combustion chambers of the engine 53 are discharged out of the engine room 11 through an exhaust device 55 and a muffler 56.

Figure 4:
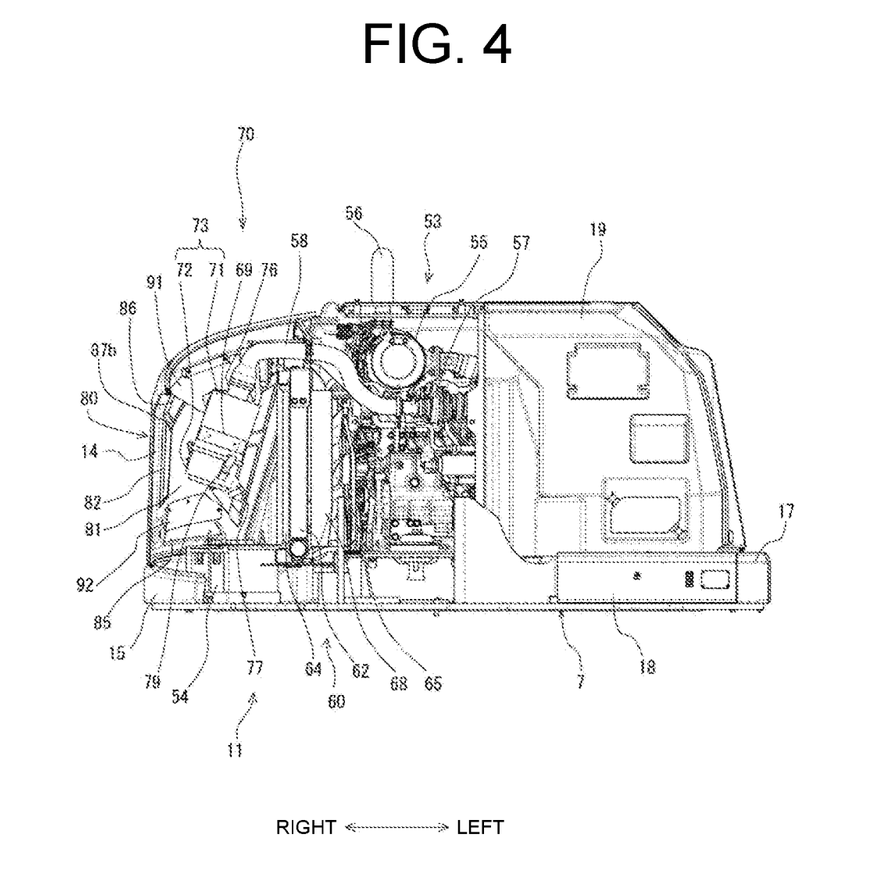
FIG. 4 is a view from arrow II in FIG. 3.

The heat exchange unit 60 and the cooling fan 65 are arranged at a right side rear of the swivel frame 7, that is, on a right side of the engine 53. As shown in FIG. 4, the engine 53, the cooling fan 65, and the heat exchange unit 60 are arranged on the swivel frame 7, in that order, from the inside of the engine room 11 toward the right side. In other words, the heat exchange unit 60 is arranged on an air suction side of the cooling fan 65, and the engine 53 is arranged on an air discharge side of the cooling fan 65. The battery 54, which stores electric power supplied to the electrical components mounted on the excavation work machine 1, is fixed to the bottom plate 7a at the right side rear of the swivel frame 7, and on a right side of the heat exchange unit 60.

The heat exchange unit 60 comprises a radiator 61, an oil cooler 62, and a condenser 63.

The radiator 61 is a heat exchanger for cooling engine cooling water and comprises a circulation passage through which the cooling water circulates and a heat dissipating part. The radiator 61 is connected to a reserve tank 64 that stores the cooling water that temporarily overflows from the circulation passages in the radiator 61. The oil cooler 62 is a heat exchanger for cooling the hydraulic oil that operates the hydraulic cylinders, etc., and comprises a circulation passage in which the hydraulic oil circulates and a heat dissipating part. The oil cooler 62 cools the hydraulic oil returning to the hydraulic oil tank by dissipating heat of the returning oil from each hydraulic cylinder in the heat dissipation part. In addition, the condenser 63 is a heat exchanger for cooling a high-pressure refrigerant of an air conditioning device (not shown) that conditions air in the cabin 10, and is connected to a compressor that is not shown.

The radiator 61 and the oil cooler 62 are arranged in a row in the approximately front-rear direction. The condenser 63 is arranged on a right side of the radiator 61 and the oil cooler 62, and is arranged opposite the radiator 61 and the oil cooler 62.

The cooling fan 65 is arranged facing the heat exchange unit 60. The cooling fan 65 is an axial-flow fan with a plurality of blades attached to a cylindrical hub, and has a boss part in a central part of the hub that is fitted into a rotating shaft of an electric motor. For example, the cooling fan 65 is installed by fitting the boss part of the cooling fan 65 to one end side of a crankshaft of the engine 53, thereby rotating with rotation of the crankshaft. By rotating the cooling fan 65, outside air for cooling is taken into the engine room 11 from each of ventilation holes 82, 83, 84, 85 and 86 formed on the right exterior cover 14, and the outside air flows into the heat exchange unit 60.

A fan shroud 68 is provided between the cooling fan 65 and the heat exchange unit 60. The fan shroud 68 is box-shaped, protruding to a left side from the radiator 61 and the oil cooler 62 of the heat exchange unit 60 and enclosing the cooling fan 65 from an outer peripheral side thereof.

The air cleaner 70 cleans the air sucked in by the engine 53 and is configured as a centrifugal separation type air cleaner that uses centrifugal force to remove dust containing sand and gravel from the taken-in air. The air cleaner 70 comprises a cleaner body part 73 that has a cylindrical casing 71 housing a filter element (not shown) inside and a lid 72 provided at one end of the casing 71, and an outside air introduction part 74 provided on an outer peripheral wall of the casing 71. The cleaner body part 73 is configured as a cylindrical body. At the other end of the casing 71, which is an opposite side of the lid 72, there is provided a connection part 76 in which an opening is formed for connecting to the intake piping 58 extending from an intake side of the engine 53.

The air cleaner 70 is disposed vertically on the right side of the heat exchange unit 60 with the lid 72 side of the cylindrical cleaner body part 73 down. A coupling part 69 is provided at a middle part of the cylinder of the casing 71, and the casing 71 is fixed via the coupling part 69 to a stay (not shown) erected on the bottom plate 7a of the swivel frame 7. The air cleaner 70 is thus arranged to be positioned in a space between the right exterior cover 14 and the heat exchange unit 60.

The lid 72 is openable or detachable attached to one end of the casing 71 by a metal fixture 79. By opening the lid 72, the filter element housed inside can be inserted and removed into and out of the casing 71.

The air cleaner 70 is arranged diagonally downward so that a lower end of the cleaner body part 73, which is the lid 72 side of the cleaner body part 73, is closer to a ventilation part 80 of the right exterior cover 14. Thus, the air cleaner 70 is arranged vertically with end parts of the cylindrical cleaner body part 73 as an upper end and a lower end, and is arranged with the lower end part of the cleaner body part 73 inclined downward toward the ventilation part 80, so that a lower end opening of the casing 71 when the lid 72 is removed faces slightly toward the outside of the engine room 11. Therefore, it is easier to insert and remove the filter element into and out of the casing 71 during the filter element replacement work performed by removing the right exterior cover 14.

The lid 72 also functions as a dust collection cup to receive the dust containing sand and gravel. A dust discharge part 77 for discharging the dust containing sand and gravel from the lid 72 to the outside is provided on an outer peripheral wall of the lid 72, and the outer peripheral wall of the lid 72 is downward than the right exterior cover 14 side of the lid 72. At a tip end of the dust discharge part 77, a cap body 78 is attached, which is made of elastic material such as rubber and can be deformed in both open and closed states.

The outside air introduction part 74 comprises a cylindrical pipe bent into an approximately inverted L-shape, and is provided on a side wall of the casing 71 near the connection part 76, protruding downward. The downward end part of the outside air introduction part 74 is a suction port 75 for sucking outside air. The suction port 75 may be equipped with, for example, a mesh filter to prevent the suction of pebbles and the like. The fact that the outside air introduction part 74 is provided on the cleaner body part 73 so that the suction port 75 faces a floor surface of the engine room 11, that is, the bottom plate 7a of the swivel frame 7, can prevent water that has entered the engine room 11 from entering the outside air introduction part 74. As a result, deterioration of the filter element of the cleaner body part 73 can be delayed compared to a case in which the outside air introduction part 74 is provided so that the suction port 75 is, for example, facing sideways or upward.

The air cleaner 70 is connected to the engine 53 via the intake piping 58. The intake piping 58 extends from an upper end side of the cleaner body part 73 of the air cleaner 70, passes above the heat exchange unit 60 and the cooling fan 65, and is connected to the supercharger 57 of the engine 53. In other words, the air cleaner 70 introduces outside air that flows in from each of the ventilation holes 82, 83, 84, 85 and 86 of the ventilation part 80 described below into the cleaner body part 73 via the outside air introduction part 74, and supplies cleaned air to the supercharger 57 of the engine 53 via the intake piping 58.

The right exterior cover 14 is a side cover that forms a right side wall of the exterior cover covering the engine room 11, and has a rectangular shape with an upper end part inclined from a rear side to a front side in a right side view of the machine body (see FIG. 2). Furthermore, the right exterior cover 14 comprises the ventilation part 80 with the plurality of ventilation holes 82, 83, 84, 85 and 86 to allow outside air to pass into the engine room 11, and a cover body part 14a surrounding a periphery of the ventilation part 80. The right exterior cover 14 has an arc-shaped surface that follows an approximate circular outline of the swivel frame 7 (see FIG. 3). The ventilation part 80 is provided in a predetermined area of the arc-shaped surface of the right exterior cover 14.

Figure 5:
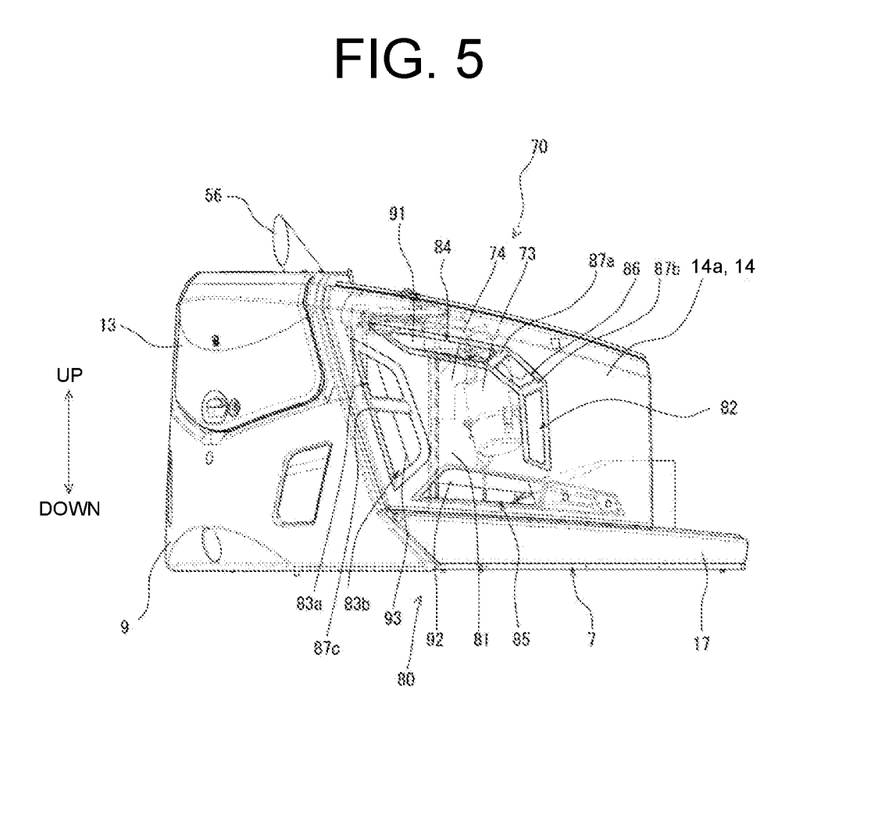
FIG. 5 is a view from arrow III in FIG. 3.
Figure 6:
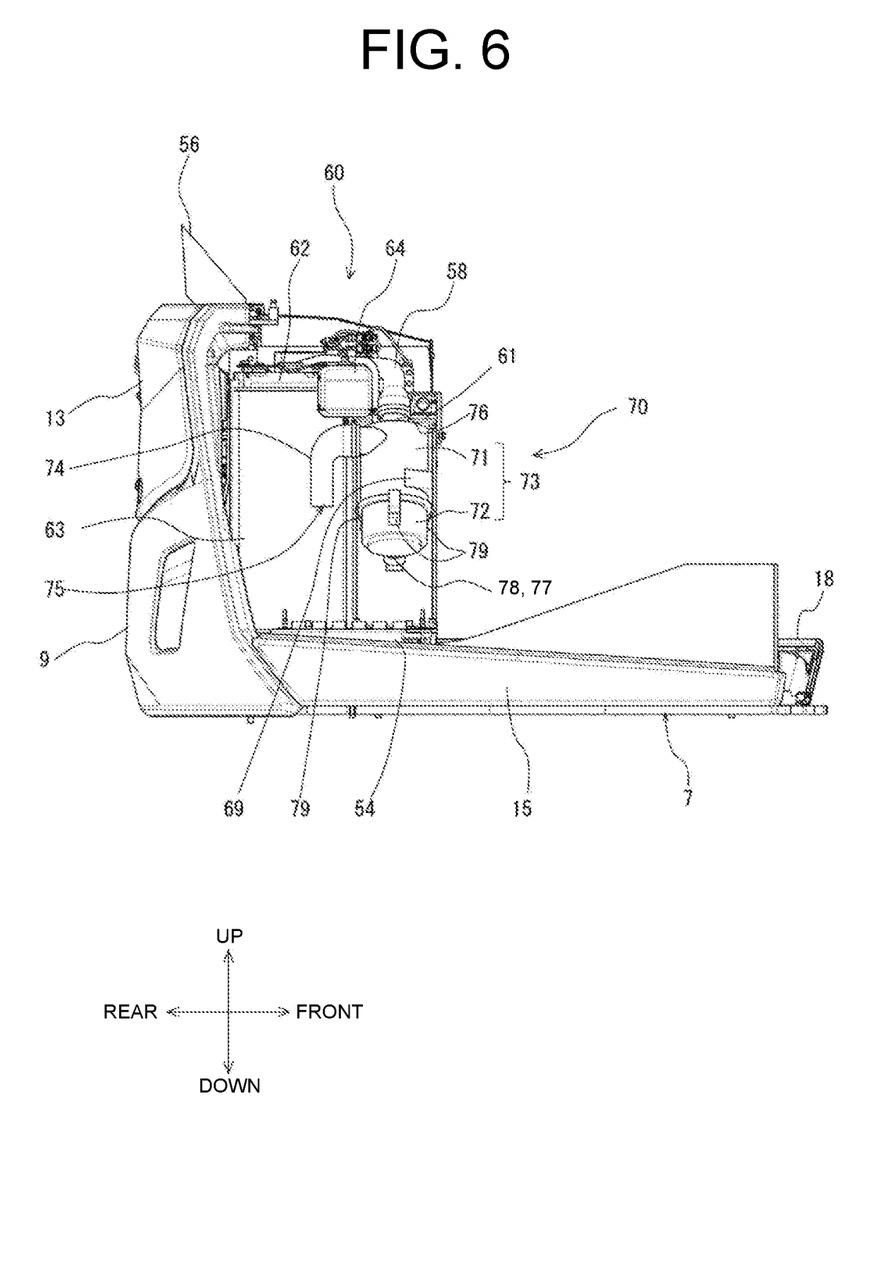
FIG. 6 is a view from arrow IV in FIG. 3.

The ventilation part 80 is a region that occupies roughly one-half to two-thirds of the area of a rear side of the right exterior cover 14, and is provided in a position approximately opposite the air cleaner 70 and the heat exchange unit 60 arranged in the engine room 11. The ventilation part 80 is provided with an approximately square shaped central plate part 81, and a front side ventilation hole 82, a rear side ventilation hole 83, an upper side ventilation hole 84, a lower side ventilation hole 85, and an intermediate ventilation hole 86, all of which surround the central plate part 81.

The central plate part 81 is integrally formed with the cover body part 14a of the right exterior cover 14. The front side ventilation hole 82 and the rear side ventilation hole 83 are formed as openings on both sides of the central plate part 81 in the front-rear direction, respectively. The upper side ventilation hole 84 and the lower side ventilation hole 85 are formed as openings on both sides of the central plate part 81 in the up-down direction, respectively. In other words, the ventilation holes are provided at an upper edge part, a lower edge part, a right edge part, and a left edge part of the central plate part 81, respectively.

The central plate part 81 is a shielding plate part that is arranged in the right exterior cover 14 so that the central plate part 81 is approximately opposite the heat exchange unit 60 arranged in the engine room 11, and blindfolds the configuration inside the engine room 11 (e.g., air cleaner 70 and heat exchange unit 60) from the outside while shielding noise in the engine room 11.

The front side ventilation hole 82 provided on a front side of the central plate part 81 and the rear side ventilation hole 83 provided on a rear side of the central plate part 81 are oblong openings that are long in the up-down direction and have an approximately rectangular shape with the up-down direction being a longitudinal direction. The rear side ventilation hole 83 is separated into a first rear side ventilation hole 83a and a second rear side ventilation hole 83b by a reinforcing part 87c for structural reinforcement of the right exterior cover 14. The upper side ventilation hole 84 provided on an upper side of the central plate part 81 and the lower side ventilation hole 85 provided on a lower side of the central plate part 81 are laterally long openings that are long in the front-rear direction and have an approximately rectangular shape with the front-rear direction being a longitudinal direction.

The front side ventilation hole 82 and the upper side ventilation hole 84 are jointly connected in such a manner that one end of a short side of the front side ventilation hole 82 and one end of a short side of the upper side ventilation hole 84 sandwich the intermediate ventilation hole 86. A reinforcing part 87a is provided between the front side ventilation hole 82 and the intermediate ventilation hole 86. Similarly, a reinforcing part 87b is provided between the upper side ventilation hole 84 and the intermediate ventilation hole 86.

Each of the ventilation holes 82, 83, 84, 85 and 86 has a different opening shape, and shapes of the approximately rectangular shape of each of the ventilation holes 82, 83, 84, 85 and 86 include a rhombic shape and/or a trapezoidal shape. In other words, an opening area of each of the ventilation holes 82, 83, 84, 85, and 86 is not required to be the same area.

The ventilation part 80 has a plurality of adjustment plates that adjust an amount or a direction of outside air that is allowed to flow into the engine room 11. As the adjustment plates, a first adjustment plate 91 for the upper side ventilation hole 84, a second adjustment plate 92 for the rear side ventilation hole 83, and a third adjustment plate 93 for the lower side ventilation hole 85 are attached from inside the right exterior cover 14, respectively.

The first adjustment plate 91 is provided in an eaves shape at the upper side edge part of the upper side ventilation hole 84, and the eaves have a shape that extends to the intermediate ventilation hole 86 side. The first adjustment plate 91 is shaped with a notch along the shape of the casing 71 of the air cleaner 70 to avoid interference with the air cleaner 70. By adjusting an installation angle of the first adjustment plate 91, an airflow direction of outside air flowing in mainly from the upper side ventilation hole 84 and the intermediate ventilation hole 86 is adjusted. In other words, the first adjustment plate 91 functions as an air guiding plate that directs a flow of outside air to the suction port 75 of the air cleaner 70 and the heat exchange unit 60.

The second adjustment plate 92 is a long, approximately rectangular plate, and is provided on the central plate part 81 side inside the right exterior cover 14 so as to cover a front side of the rear side ventilation hole 83 with the up-down direction as a lengthy direction. The second adjustment plate 92 functions as a regulating plate to restrict airflow by adjusting an opening area of the rear side ventilation hole 83 in order to adjust an amount of outside air taken in from the rear side ventilation hole 83.

The third adjustment plate 93 is a long, approximately rectangular plate, and is provided on the central plate part 81 side inside the right exterior cover 14 so as to cover an upper side of the lower side ventilation hole 85 with the front-rear direction as a lengthy direction. The third adjustment plate 93 functions as a regulating plate to restrict airflow by adjusting an opening area of the lower side ventilation hole 85 in order to adjust an amount of outside air taken in from the lower side ventilation hole 85.

The first adjustment plate 91, the second adjustment plate 92, and the third adjustment plate 93 also function as sound insulating plates that block noise generated by driving the air cleaner 70, the engine 53, and the cooling fan 65 in the engine room 11.

As shown in FIG. 5, the air cleaner 70 is in a state of being mostly hidden by the central plate part 81 in the right rear view of the swivel frame 7 with the plate surface of the central plate part 81 of the ventilation part 80 as a front surface. In other words, the cleaner body part 73 and the outside air introduction part 74 of the air cleaner 70 are in a state of being hidden from up to down by the central plate part 81. The suction port 75 of the outside air introduction part 74 of the air cleaner 70 is oriented downward to face the floor surface of the engine room 11 and is arranged in a position hidden by the central plate part 81 lower than the upper side ventilation hole 84. Outside air flowing in from the upper side ventilation hole 84 is directed downward diagonally by the first adjustment plate 91 and is efficiently sucked in from the suction port 75 of the air cleaner 70 toward the inside of the cleaner body part 73.

In addition, none of the front side ventilation hole 82, the rear side ventilation hole 83, or the lower side ventilation hole 85 are blocked by the air cleaner 70. This arrangement of the air cleaner 70 improves the heat exchange efficiency in the heat exchange unit 60 because the air flow to the heat exchange unit 60 is unimpeded. Therefore, the engine 53 and the hydraulic oil can be cooled efficiently.

The air cleaner 70 is arranged so that the cleaner body part 73 and the suction port 75 of the outside air introduction part 74 are adjacent to the central plate part 81 (see FIGS. 3, 4 and 7). As a result, an intake sound of the air cleaner 70 when sucking outside air from the suction port 75 is shielded by the central plate part 81. Therefore, the intake noise leaking outside the engine room 11 is reduced, which enables to realize noise reduction of the excavation work machine 1.

It can be said that the excavation work machine 1 of the present embodiment, with the configuration described above, has the following configuration. In other words, the excavation work machine 1 comprises the engine room 11 provided on a vehicle body frame (swivel frame 7) and housing equipment including a prime mover (engine 53) and a heat exchanger (heat exchanger unit 60), the ventilation part 80 provided on an exterior cover (right exterior cover 14) forming a side wall of the engine room 11 and having the plurality of ventilation holes 82, 83, 84, 85 and 86 for communicating inside and outside of the engine room 11, and the air cleaner 70 that is arranged between the heat exchanger (heat exchange unit 60) and the ventilation part 80 in the engine room 11 and supplies cleaned air to the prime mover (engine 53).

It can also be said that the air cleaner 70 has the following configuration in relation to the right exterior cover 14 In other words, the ventilation part 80 of the right exterior cover 14 has the shielding plate part (central plate part 81) for separating the inside of the engine room 11 from the outside, the plurality of ventilation holes 82, 83, 84, 85 and 86 is provided so as to surround the central plate part 81, and the air cleaner 70 is provided adjacent to the central plate part 81.

According to the configuration described above, the air cleaner 70 is adjacent to the central plate part 81, which allows the central plate part 81 to shield the intake sound of the air cleaner 70 and reduce the intake noise leaking outside the machine body.

Furthermore, the air cleaner 70 has the cleaner body part 73 that removes dust contained in outside air and the outside air introduction part 74 for introducing outside air into the cleaner body part 73, and the cleaner body part 73 is arranged adjacent to the central plate part 81.

According to the configuration described above, the cleaner body part 73 is arranged adjacent to the central plate part 81, so that most of the ventilation holes 82, 83, 84, 85, and 86 are not blocked by the cleaner body part 73, which allows outside air to be efficiently directed to the heat exchange unit 60. Thus, the heat exchange unit 60 can efficiently cool the engine cooling water and the hydraulic oil.

The air cleaner 70 is arranged so that the suction port 75 for air, which is provided at the outside air introduction part 74, is adjacent to the shielding plate part (central plate part 81).

According to the configuration described above, the intake sound from the suction port 75 of the air cleaner 70 can be shielded by the central plate part 81 while the air taken into the engine 53 is at an optimal temperature.

In addition, the outside air introduction part 74 of the air cleaner 70 is disposed in the cleaner body part 73 with the suction port 75 facing a direction of the floor surface (bottom plate 7a) of the engine room 11.

In addition, the outside air introduction part 74 of the air cleaner 70 is extended downward from a side surface of the cylindrical cleaner body part 73.

According to the configuration described above, it is possible to prevent water and the like that enters the engine room 11 from the ventilation holes 82, 83, 84, 85 and 86 from being sucked into the air cleaner 70. As a result, the deterioration of the filter element in the cleaner body part 73 of the air cleaner 70 can be slowed down and the frequency of filter element replacement can be reduced. In other words, economic efficiency in terms of running cost of a construction machine can be improved.

The air cleaner 70 is arranged vertically with the end parts of the cylindrical cleaner body part 73 as the upper end and the lower end, and is arranged with the lower end part of the cleaner body part 73 inclined downward toward the ventilation part 80.

According to the configuration described above, when the right exterior cover 14 is removed to perform maintenance work on the air cleaner 70, replacement work of the internal filter element can be done smoothly.

In addition, the air cleaner 70 has the dust discharge part 77 protruding downward from a side surface of the cleaner body part 73.

According to the configuration described above, gravel and the like separated by the dust discharge part 77 can be periodically discharged to the outside of the air cleaner 70. As a result, deterioration of the filter element and the like in the casing 71 can be reduced.

The description of the above-described embodiment merely constitutes one example of the present invention, and the construction machine according to the present invention is not limited to the above-described embodiment. Accordingly, it is needless to say that various modifications can be made even to those other than the above-described embodiment according to the design and the like within the scope that does not depart from the technical idea of the present invention. The effects described in the present disclosure are merely illustrative and are not limited, and other effects may also be exerted.

In the embodiment described above, a diesel engine is employed as the prime mover, but the prime mover can be any engine that sucks air and burns fuel, and is not limited to a diesel engine.

REFERENCE SIGNS LIST

1: Excavation work machine (construction machine)
2: traveling vehicle body
5: Traveling part
7: Swivel frame (vehicle body frame)
10: Cabin
11: Engine room
12: Right upper cover
14: Right exterior cover
53: Engine (prime mover)
57: Supercharger
58: Intake piping
60: Heat exchange unit (heat exchanger)
65: Cooling fan
70: Air cleaner
71: Casing
72: Lid
73: Cleaner body part
74: Outside air introduction part
75: Suction port
76: Connection part
77: Dust discharge part
78: Cap body
80: Ventilation part
81: Central plate part (shielding plate part)
82: Front side ventilation hole
83: Rear side ventilation hole
84: upper side ventilation hole
85: lower side ventilation hole
87: Reinforcing part
91: First adjustment plate The inventon claimed is:

1. A construction machine, comprising:
an engine room provided on a vehicle body frame, and housing equipment including a prime mover and a heat exchanger;
an exterior cover forming a side wall of the engine room extending in a vertical direction, and having a central plate part for separating the inside of the engine room from the outside and a plurality of ventilation holes surrounding the central plate part for communicating inside and outside of the engine room; and
an air cleaner arranged vertically adjacent to the central plate part so as to prevent water from entering the air cleaner through ventilation holes and to perform maintenance work by removing the exterior cover.

2. The construction machine according to claim 1, wherein
the air cleaner has a cleaner body part for removing dust contained in outside air and an outside air introduction part for introducing outside air into the cleaner body part, the cleaner body part being arranged adjacent to the shielding plate part.

3. The construction machine according to claim 2, wherein
the air cleaner is arranged so that a suction port for air, which is provided at the outside air introduction part, is adjacent to the shielding plate part.

4. The construction machine according to claim 3, wherein
the outside air introduction part of the air cleaner is disposed in the cleaner body part with the suction port facing a direction of a floor surface of the engine room.

5. The construction machine according to claim 2, wherein
the outside air introduction part of the air cleaner is extended downward from a side surface of the cleaner body part having a cylindrical shape.

6. The construction machine according to claim 5, wherein
the air cleaner is arranged vertically with end parts of the cylindrical cleaner body part as an upper end and a lower end, and is arranged with the lower end part of the cleaner body part inclined downwardly.

7. The construction machine according to claim 5, wherein
the air cleaner has a dust discharge part protruding downward from a side surface of the cleaner body part.

8. The construction machine according to claim 1, wherein the air cleaner is disposed closer to one side wall of the engine room than to a middle position in a width direction of the vehicle body frame.

* * * * *